United States Patent
Bacherov et al.

(10) Patent No.: US 11,828,858 B2
(45) Date of Patent: Nov. 28, 2023

(54) MULTI-STAGED PIPELINED GNSS RECEIVER

(71) Applicant: Trimble Inc., Sunnyvale, CA (US)

(72) Inventors: Andrey Bacherov, Moscow (RU); Charles Manning, Christchurch (NZ)

(73) Assignee: Trimble Inc., Sunnyvale, CA (US)

(*) Notice: Subject to any disclaimer, the term of this patent is extended or adjusted under 35 U.S.C. 154(b) by 0 days.

(21) Appl. No.: 17/961,333

(22) Filed: Oct. 6, 2022

(65) Prior Publication Data
US 2023/0023372 A1    Jan. 26, 2023

Related U.S. Application Data

(63) Continuation of application No. 16/888,039, filed on May 29, 2020, now Pat. No. 11,493,640.

(51) Int. Cl.
| | |
|---|---|
| *G01S 19/11* | (2010.01) |
| *G01S 19/25* | (2010.01) |
| *G01S 19/42* | (2010.01) |

(52) U.S. Cl.
CPC ............ G01S 19/258 (2013.01); G01S 19/11 (2013.01); G01S 19/252 (2013.01); G01S 19/428 (2013.01)

(58) Field of Classification Search
CPC ...... G01S 19/258; G01S 19/11; G01S 19/252; G01S 19/428
USPC .................................................. 342/357.39
See application file for complete search history.

(56) References Cited

U.S. PATENT DOCUMENTS

| | | | |
|---|---|---|---|
| 6,104,978 A | 8/2000 | Harrison et al. | |
| 6,249,542 B1 * | 6/2001 | Kohli | H04B 1/7085 |
| | | | 375/150 |
| 11,493,640 B2 | 11/2022 | Bacherov et al. | |
| 2005/0163201 A1 | 7/2005 | Krasner | |
| 2011/0051862 A1 | 3/2011 | Li et al. | |
| 2013/0016010 A1 | 1/2013 | Nayyar et al. | |

(Continued)

FOREIGN PATENT DOCUMENTS

| | | |
|---|---|---|
| CA | 2 542 702 A1 | 10/2006 |
| CA | 2 628 795 A1 | 4/2008 |

(Continued)

OTHER PUBLICATIONS

Extended European Search Report for Application No. 21175597.0-1206, dated Oct. 6, 2021, 8 pages.

(Continued)

*Primary Examiner* — Harry K Liu
(74) *Attorney, Agent, or Firm* — Kilpatrick Townsend & Stockton LLP

(57) ABSTRACT

Sets of digital samples associated with received wireless signals are received, each of the sets of digital samples corresponding to a particular RF path. The sets of digital samples are provided to a plurality of pipelines, each of the plurality of pipelines including a plurality of stages, each of the plurality of stages including one or more digital logic circuits. Sets of interconnect data are generated by the plurality of pipelines based on the sets of digital samples, the sets of interconnect data including at least one accumulating value. The sets of interconnect data are passed between adjacent pipelines of the plurality of pipelines along a direction. A result is generated by a last pipeline of the plurality of pipelines based on the at least one accumulating value.

20 Claims, 12 Drawing Sheets

(56) References Cited

U.S. PATENT DOCUMENTS

| | | | |
|---|---|---|---|
| 2015/0071332 A1 | 3/2015 | Xu et al. | |
| 2016/0033649 A1* | 2/2016 | Mathews | ............ G01S 19/246 342/357.48 |
| 2017/0168989 A1 | 6/2017 | Goswami | |
| 2018/0284288 A1 | 10/2018 | Lentz et al. | |

FOREIGN PATENT DOCUMENTS

| | | |
|---|---|---|
| CA | 2 676 342 A1 | 7/2008 |
| CN | 106908811 A | 6/2017 |
| EP | 3 916 431 A1 | 12/2021 |
| WO | 2006/003673 A1 | 1/2006 |
| WO | 2009/141453 A1 | 11/2009 |
| WO | 2010/080676 A2 | 7/2010 |

OTHER PUBLICATIONS

U.S. Appl. No. 16/888,039 First Action Interview Pilot Program Pre-Interview Communication dated Mar. 21, 2022, 8 pages.
U.S. Appl. No. 16/888,039 Notice of Allowance dated Jun. 28, 2022, 7 pages.

* cited by examiner

MULTI-STAGED PIPELINED GNSS RECEIVER

CROSS-REFERENCES TO RELATED APPLICATIONS

This application is a continuation of U.S. application Ser. No. 16/888,039, filed May 29, 2020, the contents of which are incorporated herein by reference in its entirety for all purposes.

BACKGROUND

Global navigation satellite systems (GNSS) are systems that use medium Earth orbit (MEO) satellites to provide geospatial positioning of receiving devices. Typically, wireless signals transmitted from such satellites can be used by GNSS receivers to determine their position, velocity, and time. Examples of currently operational GNSSs include the United States' Global Positioning System (GPS), Russia's Global Navigation Satellite System (GLONASS), China's BeiDou Satellite Navigation System, the European Union's (EU) Galileo, Japan's Quasi-Zenith Satellite System (QZSS), and the Indian Regional Navigation Satellite System (IRNSS). Today, GNSS receivers are used in a wide range of applications, including navigation (e.g., for automobiles, planes, boats, persons, animals, freight, military precision-guided munitions, etc.), surveying, mapping, and time referencing.

The accuracy of GNSS receivers has improved drastically over the past few decades due to several technological improvements. One such improvement is the use of differential measurement techniques, in which GNSS signals received by a fixed receiver are used to generate correction data that is communicated to a mobile receiver. Typically, a roving receiver (or simply "rover") receives the correction data from a reference source or base station that already knows its exact location, in addition to receiving signals from GNSS satellites. To generate the correction data, the base station first tracks all the satellites in view and measures their pseudoranges. Next, the base station computes its position and compares the computed position to its known position to generate a list of corrections needed to make the measured pseudorange values accurate for all visible satellites. Last the correction data is communicated to the rover. The rover applies these corrections to its computed pseudoranges to produce a much more accurate position.

Another improvement to GNSS accuracy came through the use of real-time kinematic (RTK) measurement techniques, in which the rover determines its position relative to the base station by measuring the phase of the carrier wave. The carrier signal has a much shorter wavelength than the width of a PRN code (a hundred to a thousand times shorter), therefore allowing the ability to measure distance to improve proportionally. RTK networks offer several advantages to users, including (1) fast, centimeter-level positioning anywhere over a large area, (2) a common coordinate reference frame, and (3) elimination of the need to set up a private base station for a project.

SUMMARY

A summary of the invention is provided below as a series of examples. As used below, any reference to a series of examples is to be understood as a reference to each of those examples disjunctively (e.g., "Examples 1-4" is to be understood as "Examples 1, 2, 3, or 4").

Example 1 is a method comprising: receiving sets of digital samples associated with received wireless signals, wherein each of the sets of digital samples corresponds to a particular radio-frequency (RF) path; providing the sets of digital samples to a plurality of pipelines, wherein each of the plurality of pipelines includes a plurality of stages, and wherein each of the plurality of stages includes one or more digital logic circuits; generating, by one or more of the plurality of pipelines, sets of interconnect data based on the sets of digital samples, wherein the sets of interconnect data include at least one accumulating value; passing the sets of interconnect data between adjacent pipelines of the plurality of pipelines along a direction; and generating, by a last pipeline of the plurality of pipelines, a result based on the at least one accumulating value.

Example 2 is the method of example(s) 1, wherein the sets of digital samples are received from at least one front end of a global navigation satellite systems (GNSS) receiver.

Example 3 is the method of example(s) 1-2, further comprising: receiving, from a receiver processor, control data for the plurality of pipelines; providing the control data to a first pipeline of the plurality of pipelines.

Example 4 is the method of example(s) 1-3, wherein generating the sets of interconnect data based on the sets of digital samples includes: generating, by the first pipeline, a first set of interconnect data based on a first set of digital samples of the sets of digital samples and the control data; generating, by a second pipeline of the plurality of pipelines, a second set of interconnect data based on a second set of digital samples of the sets of digital samples and the first set of interconnect data; generating, by a third pipeline of the plurality of pipelines, a third set of interconnect data based on a third set of digital samples of the sets of digital samples and the second set of interconnect data.

Example 5 is the method of example(s) 1-4, wherein passing the sets of interconnect data between the adjacent pipelines of the plurality of pipelines along the direction includes: passing the first set of interconnect data from the first pipeline to the second pipeline; and passing the second set of interconnect data from the second pipeline to the third pipeline.

Example 6 is the method of example(s) 1-5, wherein the plurality of stages are separated by a plurality of latches.

Example 7 is the method of example(s) 1-6, wherein the one or more digital logic circuits of a particular stage of the plurality of stages are identical to the one or more digital logic circuits of corresponding stages between different pipelines of the plurality of pipelines.

Example 8 is a correlator comprising: a set of inputs for receiving sets of digital samples associated with received wireless signals, wherein each of the sets of digital samples corresponds to a particular radio-frequency (RF) path; and a plurality of pipelines each including a plurality of stages, wherein each of the plurality of stages includes one or more digital logic circuits, and wherein the plurality of pipelines are configured to: generate sets of interconnect data based on the sets of digital samples, wherein the sets of interconnect data include at least one accumulating value; pass the sets of interconnect data between adjacent pipelines of the plurality of pipelines along a direction; and generate a result based on the at least one accumulating value.

Example 9 is the correlator of example(s) 8, wherein the sets of digital samples are received from at least one front end of a global navigation satellite systems (GNSS) receiver.

Example 10 is the correlator of example(s) 8, wherein the correlator is configured to receive, from a receiver processor, control data for the plurality of pipelines and to provide the control data to a first pipeline of the plurality of pipelines.

Example 11 is the correlator of example(s) 10, wherein generating the sets of interconnect data based on the sets of digital samples includes: generating, by the first pipeline, a first set of interconnect data based on a first set of digital samples of the sets of digital samples and the control data; generating, by a second pipeline of the plurality of pipelines, a second set of interconnect data based on a second set of digital samples of the sets of digital samples and the first set of interconnect data; generating, by a third pipeline of the plurality of pipelines, a third set of interconnect data based on a third set of digital samples of the sets of digital samples and the second set of interconnect data.

Example 12 is the correlator of example(s) 11, wherein passing the sets of interconnect data between the adjacent pipelines of the plurality of pipelines along the direction includes: passing the first set of interconnect data from the first pipeline to the second pipeline; and passing the second set of interconnect data from the second pipeline to the third pipeline.

Example 13 is the correlator of example(s) 8, further comprising: a plurality of latches separating the plurality of stages.

Example 14 is the correlator of example(s) 8, wherein the one or more digital logic circuits of a particular stage of the plurality of stages are identical to the one or more digital logic circuits of corresponding stages between different pipelines of the plurality of pipelines.

Example 15 is a non-transitory computer-readable medium storing instructions that, when executed by one or more processors, cause the one or more processors to perform operations comprising: receiving sets of digital samples associated with received wireless signals, wherein each of the sets of digital samples corresponds to a particular radio-frequency (RF) path; providing the sets of digital samples to a plurality of pipelines, wherein each of the plurality of pipelines includes a plurality of stages, and wherein each of the plurality of stages includes one or more digital logic circuits; generating, by one or more of the plurality of pipelines, sets of interconnect data based on the sets of digital samples, wherein the sets of interconnect data include at least one accumulating value; passing the sets of interconnect data between adjacent pipelines of the plurality of pipelines along a direction; and generating, by a last pipeline of the plurality of pipelines, a result based on the at least one accumulating value.

Example 16 is the non-transitory computer-readable medium of example(s) 15, wherein the sets of digital samples are received from at least one front end of a global navigation satellite systems (GNSS) receiver.

Example 17 is the non-transitory computer-readable medium of example(s) 15, further comprising: receiving, from a receiver processor, control data for the plurality of pipelines; providing the control data to a first pipeline of the plurality of pipelines.

Example 18 is the non-transitory computer-readable medium of example(s) 17, wherein generating the sets of interconnect data based on the sets of digital samples includes: generating, by the first pipeline, a first set of interconnect data based on a first set of digital samples of the sets of digital samples and the control data; generating, by a second pipeline of the plurality of pipelines, a second set of interconnect data based on a second set of digital samples of the sets of digital samples and the first set of interconnect data; generating, by a third pipeline of the plurality of pipelines, a third set of interconnect data based on a third set of digital samples of the sets of digital samples and the second set of interconnect data.

Example 19 is the non-transitory computer-readable medium of example(s) 18, wherein passing the sets of interconnect data between the adjacent pipelines of the plurality of pipelines along the direction includes: passing the first set of interconnect data from the first pipeline to the second pipeline; and passing the second set of interconnect data from the second pipeline to the third pipeline.

Example 20 is the non-transitory computer-readable medium of example(s) 15, wherein the plurality of stages are separated by a plurality of latches.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Figure 1A:
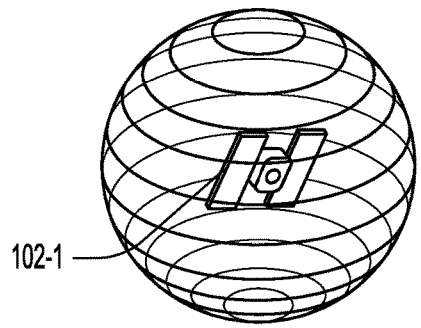
FIGS. 1A-1D illustrate an example trilateration technique performed by a global navigation satellite system (GNSS) receiver operating within a GNSS to generate a position estimate.
Figure 1B:
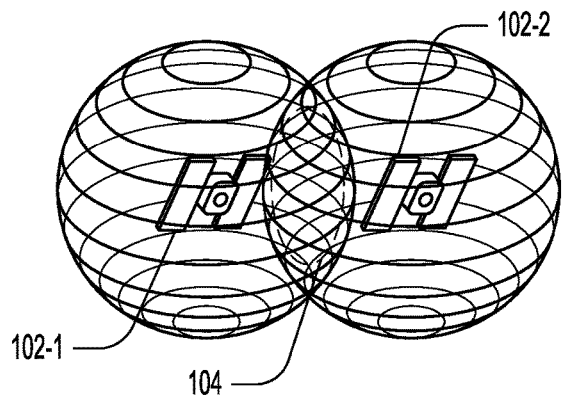

FIGS. 1A-1D illustrate an example trilateration technique performed by a global navigation satellite system (GNSS) receiver operating within a GNSS to generate a position estimate, according to some embodiments of the present disclosure. FIG. 1A shows a first scenario in which a GNSS receiver receives GNSS signals from a first satellite 102-1 and generates a distance estimate (e.g., 20,200 km) for that satellite. This informs the GNSS receiver that it is located somewhere on the surface of a sphere with a radius of 20,200 km, centered on first satellite 102-1. FIG. 1B shows a second scenario in which the GNSS receiver receives GNSS signals from a second satellite 102-2 and generates a distance estimate (e.g., 23,000 km) for the additional satellite. This informs the GNSS receiver that it is also located somewhere on the surface of a sphere with a radius of 23,000 km, centered on second satellite 102-2. This limits the possible locations to somewhere on the region 104 where the first sphere and second sphere intersect.

Figure 1C:
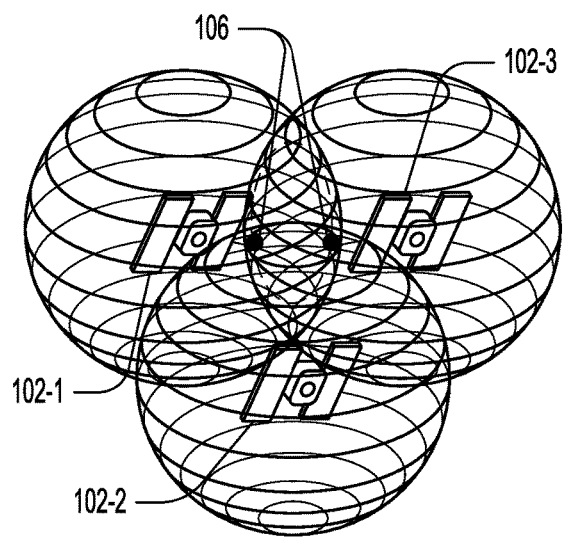
Figure 1D:
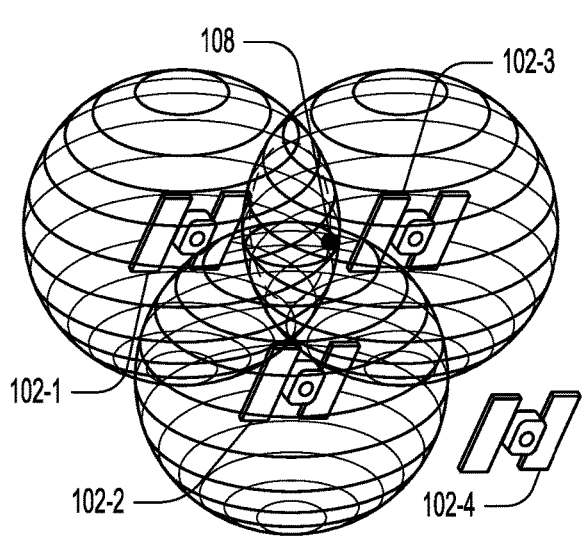

FIG. 1C shows a third scenario in which the GNSS receiver receives GNSS signals from a third satellite 102-3 and generates a distance estimate (e.g., 25,800 km) for the additional satellite. This informs the GNSS receiver that it is also located somewhere on the surface of a sphere with a radius of 25,800 km, centered on third satellite 102-3. This limits the possible locations to two points 106 where first sphere 102-1, second sphere 102-2, and third sphere 102-3 intersect. FIG. 1D shows a fourth scenario in which the GNSS receiver receives GNSS signals from a fourth satellite 102-4. Fourth satellite 102-4 can be used to resolve which of points 106 is a correct point 108 (by generating a fourth sphere) and/or to synchronize the receiver's clock with the satellites' time.

Figure 2:
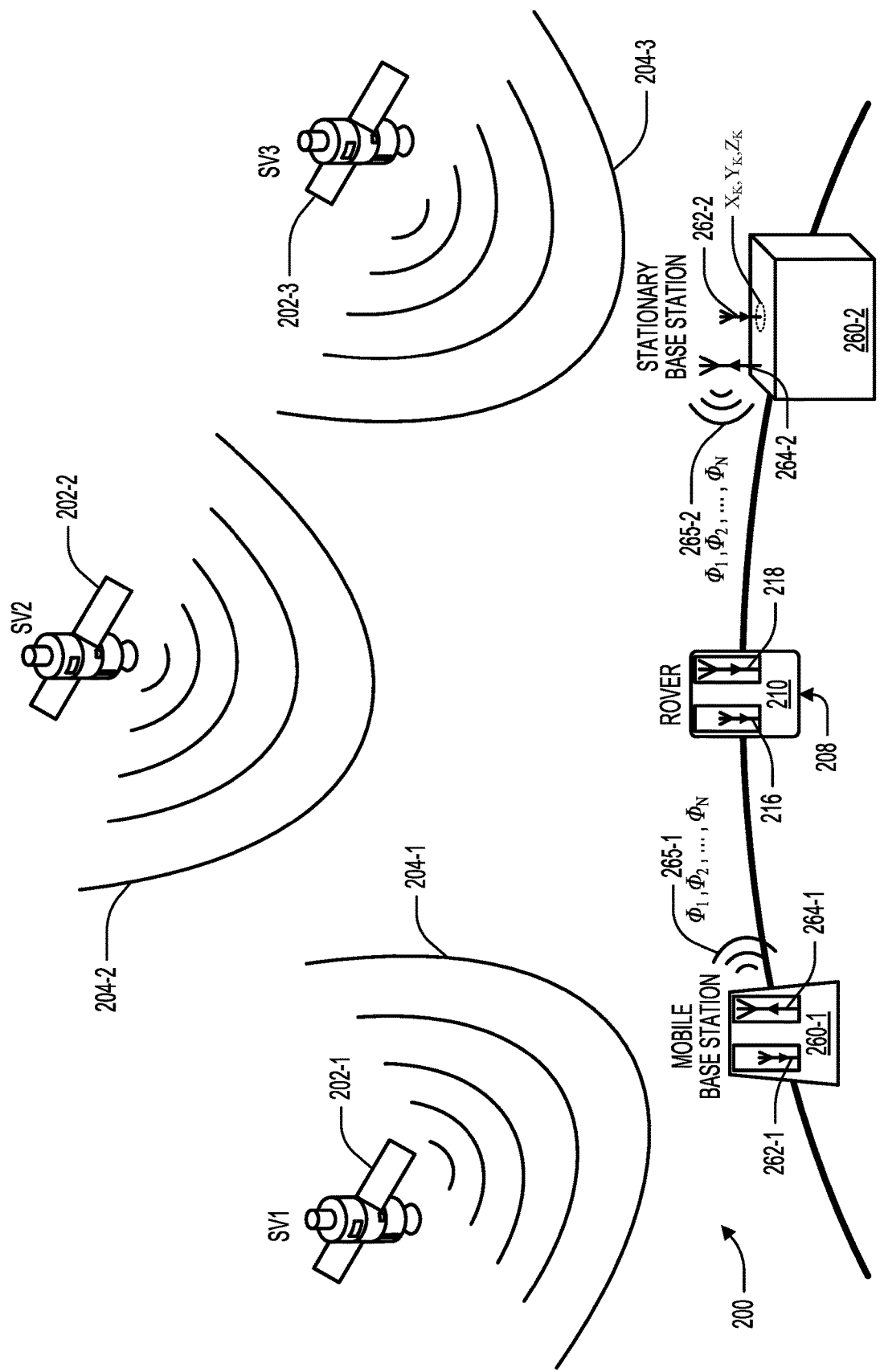
FIG. 2 illustrates an example of a rover, a mobile base station, and a stationary base station operating within a GNSS.

FIG. 2 illustrates an example of a rover 208 (containing a GNSS receiver 210), a mobile base station 260-1, and a stationary base station 260-2 operating within a GNSS 200, according to some embodiments of the present disclosure. GNSS 200 includes one or more GNSS satellites 202, i.e., space vehicles (SV), in orbit above rover 208 and base stations 260. GNSS satellites 202 may continuously, periodically, or intermittently broadcast wireless signals 204 containing PRN codes modulated onto carrier frequencies (e.g., L1 and/or L2 carrier frequencies). Wireless signals 204 corresponding to different GNSS satellites 202 may include different PRN codes that identify a particular GNSS satellite 202 such that receivers may associate different distance estimates (i.e., pseudoranges) to different GNSS satellites 202. For example, GNSS satellite 202-1 may broadcast wireless signals 204-1 which contain a different PRN code than the PRN code contained in wireless signals 204-2 broadcasted by GNSS satellite 202-2.

Similarly, GNSS satellite 202-3 may broadcast wireless signals 204-3 which contain a different PRN code than the PRN codes contained in wireless signals 204-1 and 204-2 broadcasted by GNSS satellites 202-1 and 202-2, respectively. One or more of wireless signals 204 may be received by a GNSS antenna 216 of GNSS receiver 210. GNSS antenna 216 may be a patch antenna, a turnstile antenna, a helical antenna, a parabolic antenna, a phased-array antenna, a resistive plane antenna, a choke ring antenna, a radome antenna, among other possibilities.

Each of GNSS satellites 202 may belong to one or more of a variety of system types, such as Global Positioning System (GPS), Satellite-based Augmentation System (SBAS), Galileo, Global Navigation Satellite System (GLONASS), or BeiDou, and may transmit wireless signals having one or more of a variety of signal types (e.g., GPS L1 C/A, GPS L2C, Galileo E1, Galileo E5A, etc.). For example, GNSS satellite 202-1 may be a GPS satellite and may transmit wireless signals having a GPS L1 C/A signal type (i.e., wireless signals having frequencies within the GPS L1 band and having been modulated using C/A code). GNSS satellite 202-1 may additionally or alternatively transmit wireless signals having a GPS L2C signal type (i.e., wireless signals having frequencies within the GPS L2 band and having been modulated using L2 civil codes). In some embodiments, GNSS satellite 202-1 may additionally be a Galileo satellite and may transmit wireless signals having a Galileo signal type (e.g., Galileo E1). Accordingly, a single satellite may include the ability to transmit wireless signals of a variety of signal types.

GNSS receiver 210 may use the distance estimates between itself and GNSS satellites 202-1, 202-2, and 202-3 to generate a position estimate through trilateration as described in reference to FIGS. 1A-1D. For example, multiple spheres may be generated having center locations corresponding to the locations of GNSS satellites 202 and radii corresponding to the distance estimates (i.e., pseudoranges), with the intersection point(s) of the spheres used to determine the position estimate for GNSS receiver 210. The position estimate may be continuously, periodically, or intermittently updated by generating new distance estimates and performing trilateration using the new distance estimates. Subsequent position estimates may benefit from previous position estimates through filtering processes (e.g., Kalman filtering) capable of improving position estimate accuracy. Position estimates may also be determined using other techniques. In practice, a fourth satellite may be observed to estimate the receiver clock error with respect to the satellite system time.

Mobile base station 260-1 and stationary base station 260-2 may include GNSS antennas 262-1 and 262-2, respectively, where GNSS antenna 262-2 is positioned at a known position (e.g., $X_K$, $Y_K$, $Z_K$). Mobile base station 260-1 may be movable such that multiple mobile base stations 260-1 may be brought within or surrounding a project site so as to provide high-accuracy position estimates. Each of GNSS antennas 262 may be similar to GNSS antenna 216 and may be configured to receive one or more of wireless signals 204. For example, each of GNSS antennas 262 may be a patch antenna, a turnstile antenna, a helical antenna, a parabolic antenna, a phased-array antenna, a resistive plane antenna, a choke ring antenna, a radome antenna, among other possibilities.

Each of base stations 260 may send a correction signal 265 containing correction data to GNSS receiver 210. The correction data is used by GNSS receiver 210 to improve the accuracy of its position estimate. In some embodiments, the correction data includes a plurality of carrier phases $\Phi_1, \Phi_2, \ldots, \Phi_J$, where J is the number of GNSS satellites. In some embodiments, the correction data includes a 3D offset amount (e.g., $X_C$, $Y_C$, $Z_C$) for modifying the position estimate of GNSS receiver 210. In one example, position estimates of stationary base station 260-2 made using GNSS antenna 262-2 are compared to the known position and the correction data may be generated based on the comparison. In some embodiments, the correction data includes any one of various types of raw or processed satellite data.

Correction signals 265 containing the correction data may be wirelessly transmitted by base stations 260 using correction antennas 264 and may be received by GNSS receiver 210 using a correction antenna 218. The correction signals 265 may be transmitted continuously, periodically, or intermittently by base stations 260. In some embodiments, correction signals 265 are transmitted over a set of wireless frequencies outside the GNSS frequencies (e.g., lower than the GNSS frequencies). In some embodiments, correction antennas 264 may be used for transmission only and correction antenna 218 may be used for reception only, although in some embodiments additional handshaking between GNSS receiver 210 and base stations 260 may occur.

Figure 3:
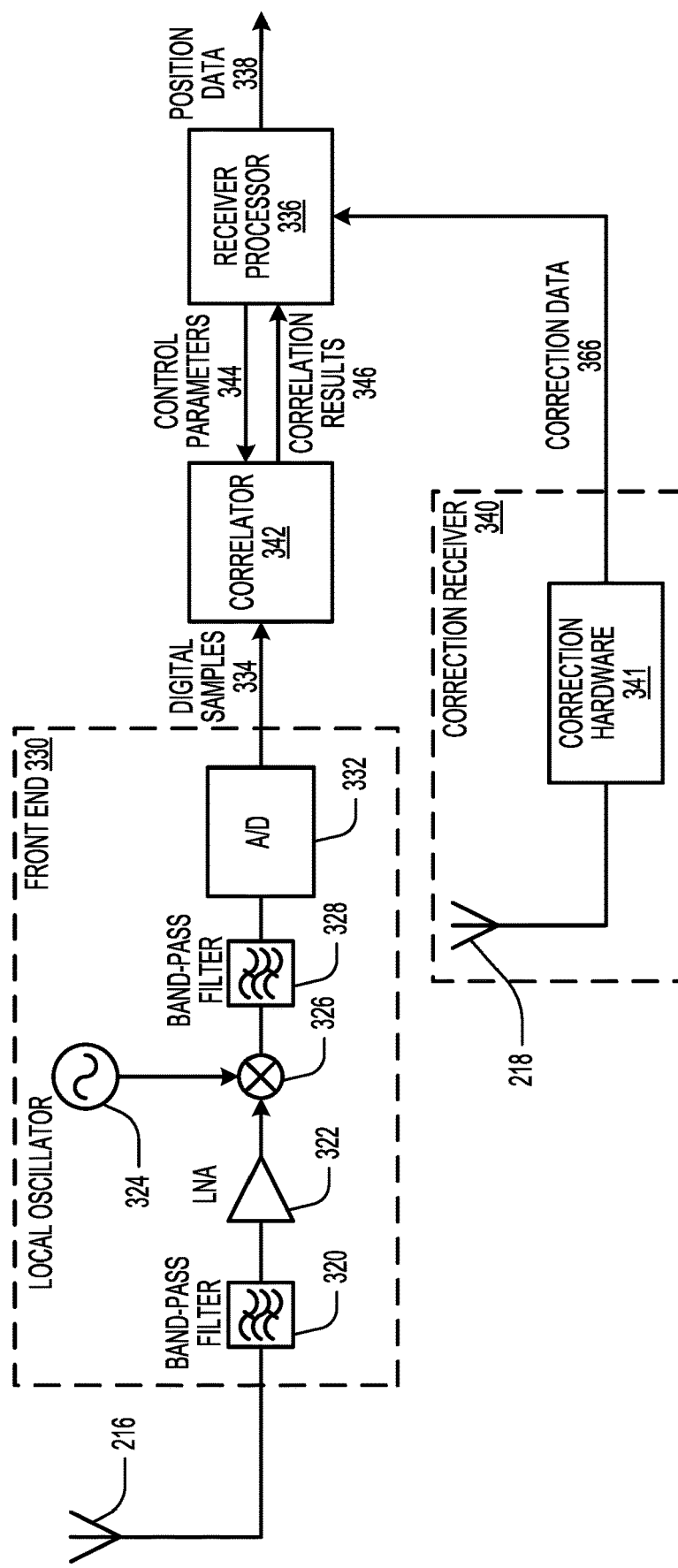
FIG. 3 illustrates an example block diagram of a GNSS receiver.

FIG. 3 illustrates an example block diagram of GNSS receiver 210, according to some embodiments of the present disclosure. GNSS receiver 210 includes antenna 216 for receiving wireless signals 204 and sending/routing wireless signals 204 to a radio-frequency (RF) front end 330. RF front ends are well known in the art, and in some instances include a band-pass filter 320 for initially filtering out undesirable frequency components outside the frequencies of interest, a low-noise amplifier (LNA) 322 for amplifying the received signal, a local oscillator 324 and a mixer 326 for down converting the received signal from RF to intermediate frequencies (IF), a band-pass filter 328 for removing frequency components outside IF, and an analog-to-digital (A/D) converter 332 for sampling the received signal to generate digital samples 334.

In some instances, RF front end 330 includes additional or fewer components than that shown in FIG. 3. For example, RF front end 330 may include a second local oscillator (90 degrees out of phase with respect to the first), a second mixer, a second band-pass filter, and a second A/D converter for generating digital samples corresponding to the quadrature component of wireless signals 204. Digital samples corresponding to the in-phase component of wireless signals 204 and digital samples corresponding to the quadrature component of wireless signals 204 may both be sent to a correlator 342. In some embodiments, digital samples corresponding to both in-phase and quadrature components may be included in digital samples 334.

Other components within RF front end 330 may include a phase-locked loop (PLL) for synchronizing the phase of local oscillator 324 with the phase of the received signal, and a phase shifter for generating a second mixing signal using local oscillator 324 that is 90 degrees out of phase with local oscillator 324. In some embodiments, RF front end 330 does not include band-pass filter 320 and LNA 322. In some embodiments, A/D converter 332 is coupled directly to antenna 216 and samples the RF signal directly without down-conversion to IF. In some embodiments, RF front end 330 only includes band-pass filter 320 and A/D converter 332. Other possible configurations of RF front end 330 are possible.

Digital samples 334 generated by RF front end 330 may be sent to a correlator 342, which may perform one or more correlations on digital samples 334 using local codes. Operation of correlator 342 may be controlled by control parameters 344 generated by a receiver processor 336. Correlator 342 may generate correlation results 346 based on digital samples 334 and control parameters 344 and send these results to receiver processor 336. In some embodiments, one or more operations performed by correlator 342 may alternatively be performed by receiver processor 336. In some embodiments, correlator 342 is a specific piece of hardware, such as an application-specific integrated circuit (ASIC) or a field-programmable gate array (FPGA). In some embodiments, operations performed by correlator 342 are performed entirely in software using digital signal processing (DSP) techniques.

Based on multiple distance estimates corresponding to multiple GNSS satellites 202, as well as correction data 366 generated by a correction receiver 340 having correction hardware 341, receiver processor 336 may generate and output position data 338 comprising a plurality of GNSS points. Each of the plurality of GNSS points may be a 3D coordinate represented by three numbers. In some embodiments, the three numbers may correspond to latitude, longitude, and elevation/altitude. In other embodiments, the three numbers may correspond to X, Y, and Z positions. Position data 338 may be outputted to be displayed to a user, transmitted to a separate device (e.g., computer, smartphone, server, etc.) via a wired or wireless connection, or further processed, among other possibilities.

Figure 4:
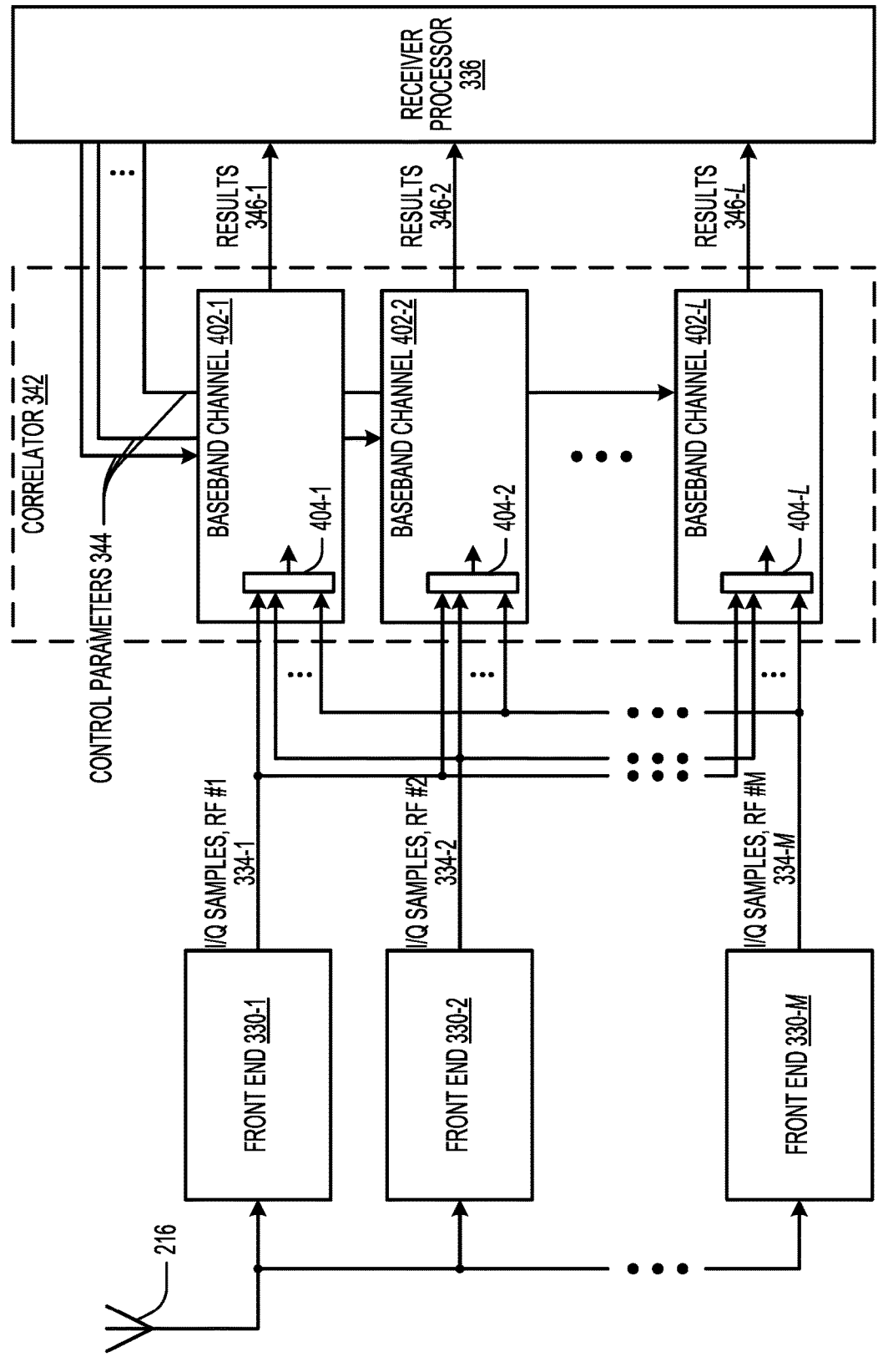
FIG. 4 illustrates an example block diagram of a GNSS receiver implemented as a multi-channel GNSS receiver.

FIG. 4 illustrates an example block diagram of GNSS receiver 210 implemented as a multi-channel GNSS receiver, according to some embodiments of the present disclosure. In the illustrated example, GNSS receiver 210 includes M front ends 330, each configured to generate and output N I/Q digital samples 334. Correlator 342 may include L baseband channels 402, each configured to receive each of the sets of I/Q samples 334. Each of baseband channels 402 may include an input multiplexer 404 that selects one of the inputs based on control parameters 344. For example, control parameters 344 may cause input multiplexer 404-1 to select I/Q samples 334-1 and input multiplexer 404-2 to select I/Q samples 334-2. Each of baseband channels 402 may generate and output results 346 that are fed into receiver processor 336.

Each of front ends 330 and baseband channels 402 may be configured to process different frequencies and/or GNSS signal types. In one implementation, GNSS receiver 210 may be configured to process GPS L1/L2/L5, GLONASS L1/L2/L3, and BeiDou B1, B2 signals. In various embodiments, such signals may be processed sequentially, concurrently, or simultaneously. In some embodiments, each of front ends 330 may be configured to process a single GNSS signal type while each of baseband channels 402 may be configured to process any GNSS signal type. For example, in one implementation, front end 330-1 may be configured to process only GPS L1 signals and front end 330-2 may be configured to process only GPS L2 signals while each of baseband channels 402-1 and 402-2 may be configured to process both GPS L1 signals and GPS L2 signals. Other possibilities are contemplated.

Figure 5:
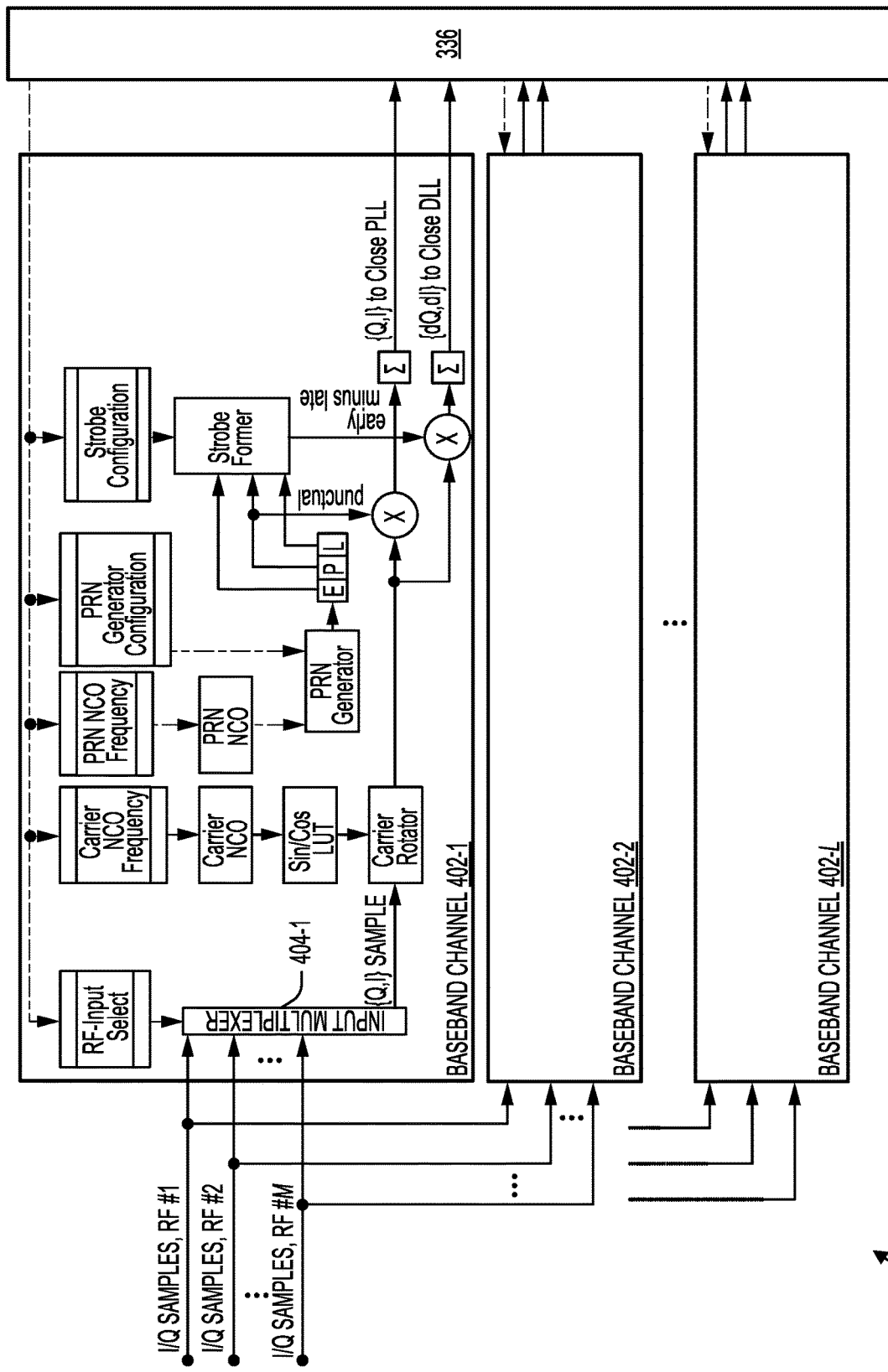
FIG. 5 illustrates an example block diagram of a correlator.

FIG. 5 illustrates an example block diagram of a correlator 342, according to some embodiments of the present disclosure. A single sample from I/Q samples 334-1 is labeled in FIG. 5 as {Q,I} sample, RF #1, a single sample from I/Q samples 334-2 is labeled as {Q,I} sample, RF #2, and a single sample from I/Q samples 334-M is labeled as {Q,I} sample, RF #M. Each of the {Q,I} samples are provided to each of baseband channels 402, and a particular {Q,I} sample is selected by each of input multiplexers 404.

Each of baseband channels 402 includes a similar internal architecture which includes an input multiplexer to select the specified RF front-end output. Each baseband channel also includes a carrier NCO that generates samples of "Carrier+ Doppler" phase, which are used to drive a sine-cosine look-up table (LUT) to get sin( ) and cos( ) waves. These waves are used as one input of a complex multiplier, referred to as a carrier rotator, which may complete down conversion from relatively low IF to baseband. Each baseband channel also includes a PRN NCO that generates samples of pseudo random noise phase, which are used to drive the PRN generator to obtain a PRN wave.

Early, punctual, and late delay lines (denoted as "E", "P", and "L", respectively) form copies of the PRN wave spaced by 1 PRN element (PRN-chip). The punctual output of the delay line goes directly to a multiplier. If the punctual output is aligned to the PRN of the received signal, this operation converts the received PRN alternations to constant level which are accumulated by an accumulator (denoted by the summation symbol) over one or several PRN periods. Output of the accumulator is treated as a metric of misalignment between the locally generated carrier and the received carrier. The early and late outputs go to a strobe former, which serves to create a kind of PRN sequence derivative. The resulting early-minus-late sequence includes a series of short pulses at places where the PRN wave changes. By multiplying the sequence with the received signal and accumulating the result over one or several PRN periods, a metric of misalignment is obtained between the locally generated PRN and the received PRN.

In some embodiments, baseband processing is controlled by receiver processor 336 by algorithms implemented in firmware, through control registers, with one goal being to achieve as good alignment as possible between the locally generated PRNs and the received PRNs. The alignment precision may be limited by various factors such as the presence of thermal noise, jamming, multi-path propagation, and so on. In some embodiments, correlator 342 may be implemented as an ASIC, which incorporates the whole set of parallel baseband channels.

As the number of GNSS constellations, the number of GNSS satellites in each constellation, and the number of signals transmitted by each GNSS satellite grows, more and more baseband channels are utilized. To keep reasonable values of power consumption and silicon die area, the feasibility of the various modern silicon fabrication technologies have been considered. FPGAs can be produced in high volumes and offer fast operation speeds at reasonable power consumption. One modern trend in the FPGA industry is to produce system on a chips (SoCs) which combine one or several central processing unit (CPU) cores, some peripheral components, and an FPGA on a single silicon die. While GNSS receivers can be fabricated with such designs, FPGAs still have their classic drawbacks, including having programmable slices which are much less effective in terms of consumed area compared to ASIC custom logic.

One technique to compensate for the inefficiencies of FPGAs is to increase the processing clock rate. By configuring the processing clock rate to be several times faster than the GNSS signal sampling frequency, the same logic circuits (e.g., the same FPGA slices) can be reused as many times as the "processing clock rate"-to-"sampling frequency" ratio.

Figure 6:
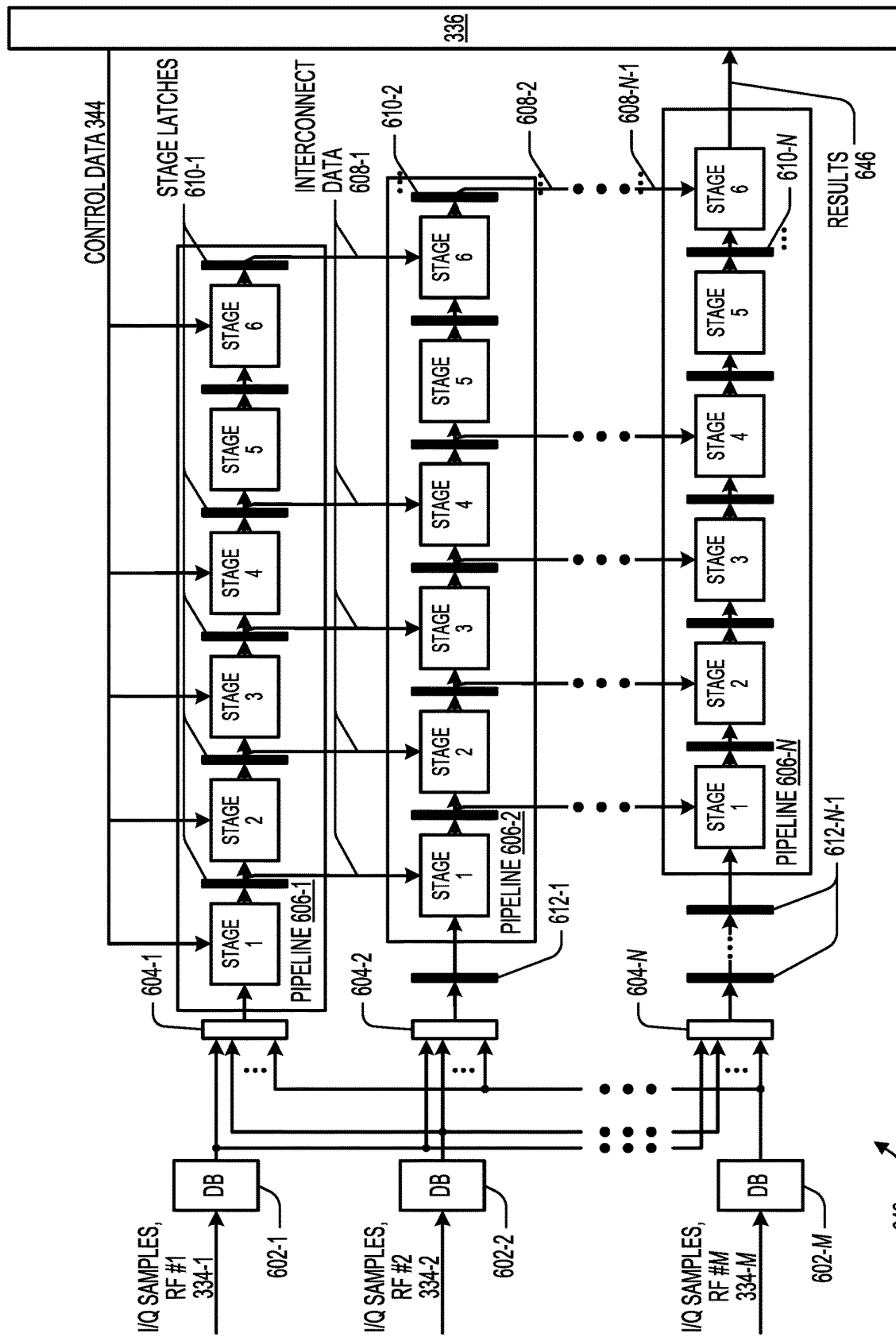
FIG. 6 illustrates an example block diagram of a correlator.
Figure 7A:
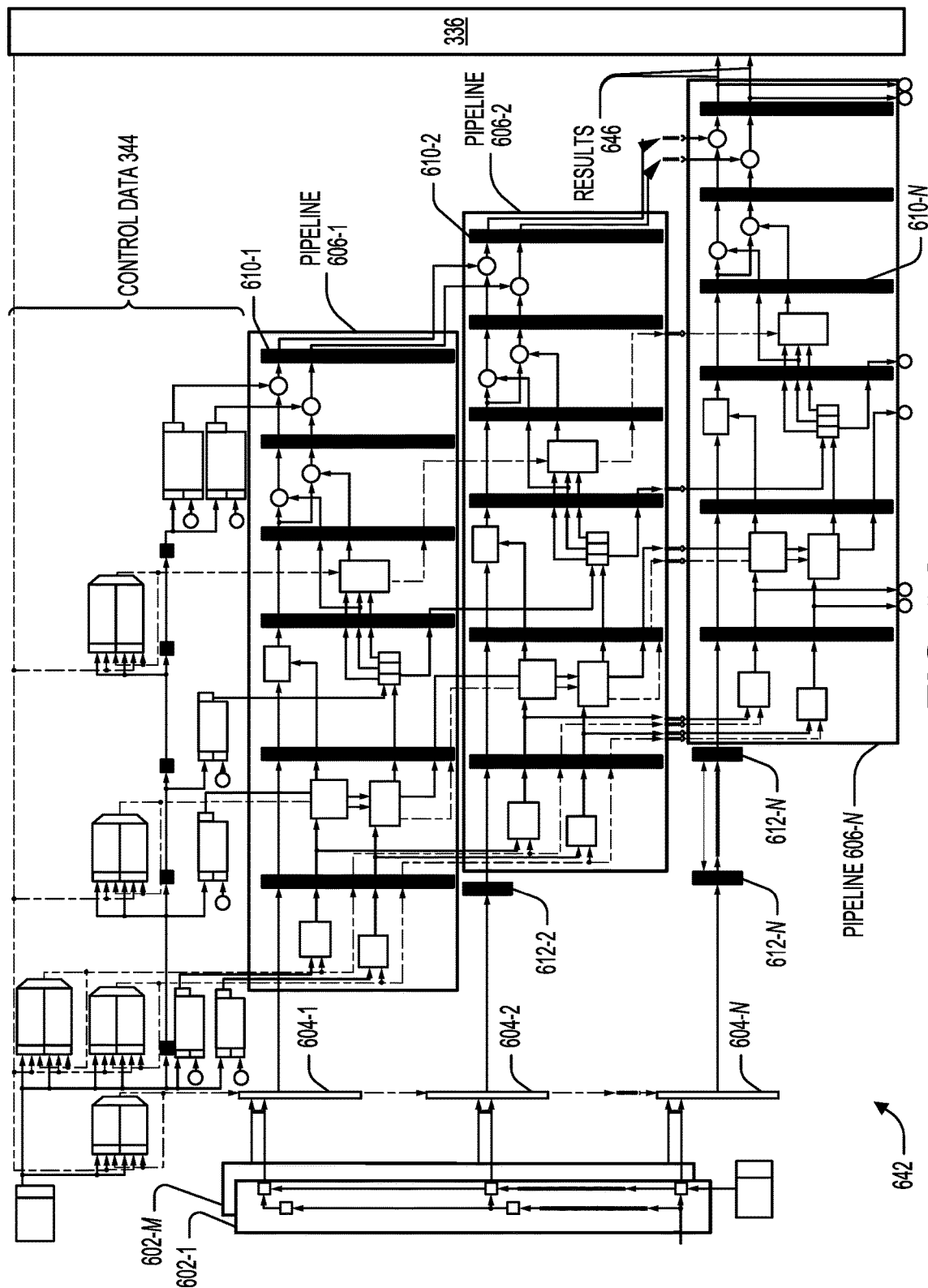
FIGS. 7A-7E illustrate an example block diagram of a correlator in greater detail.
Figure 7B:
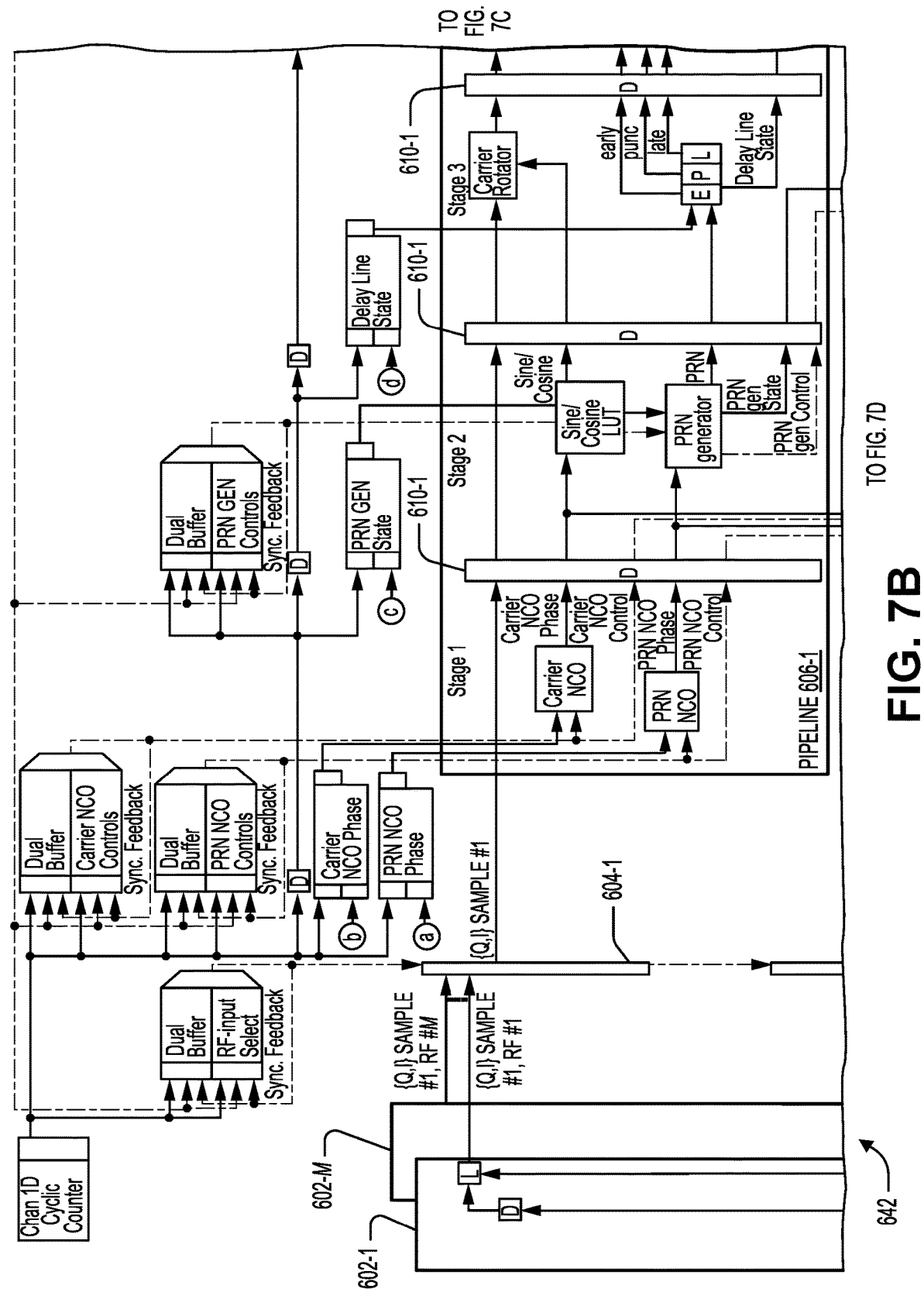
Figure 7C:
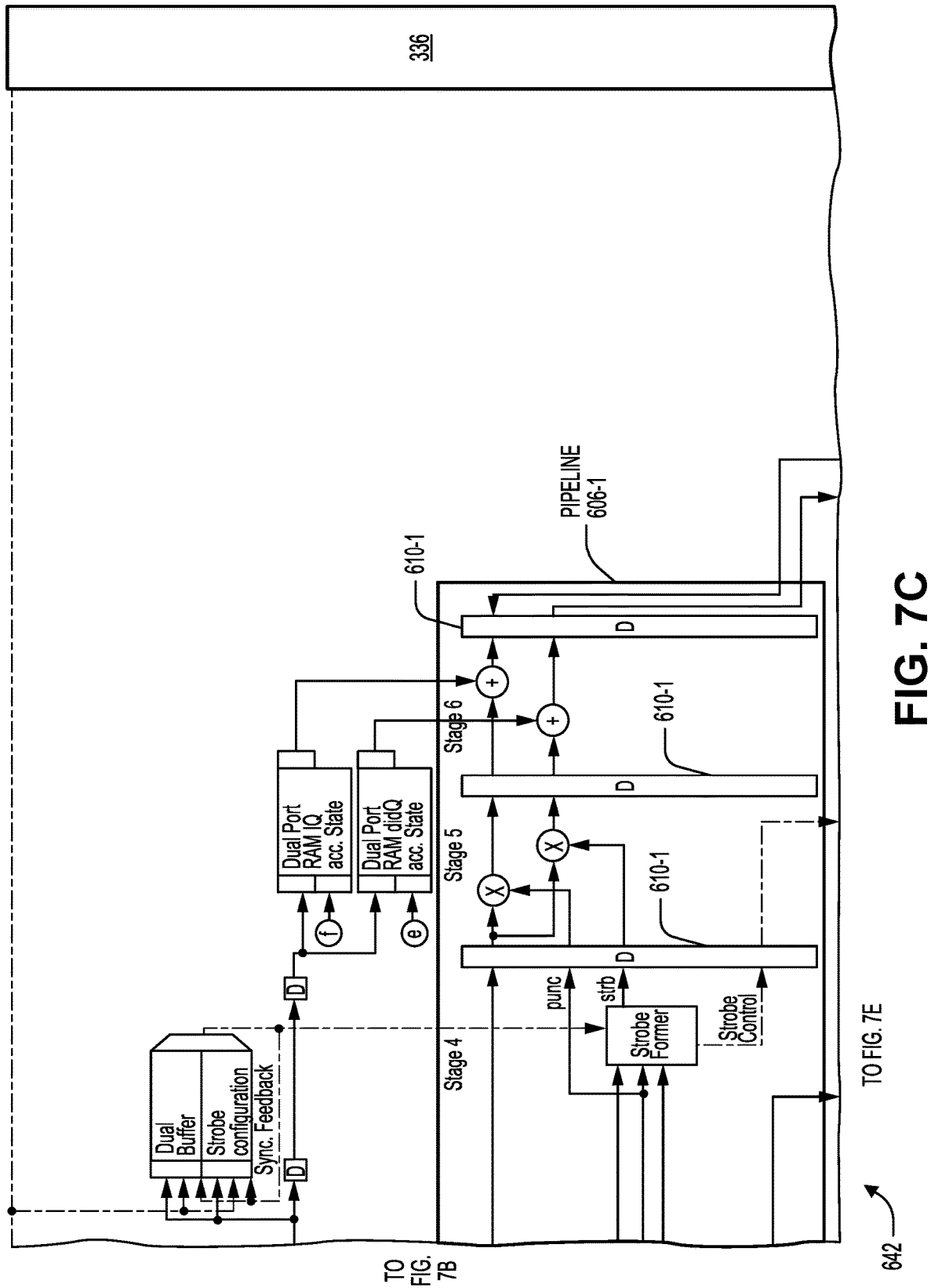
Figure 7D:
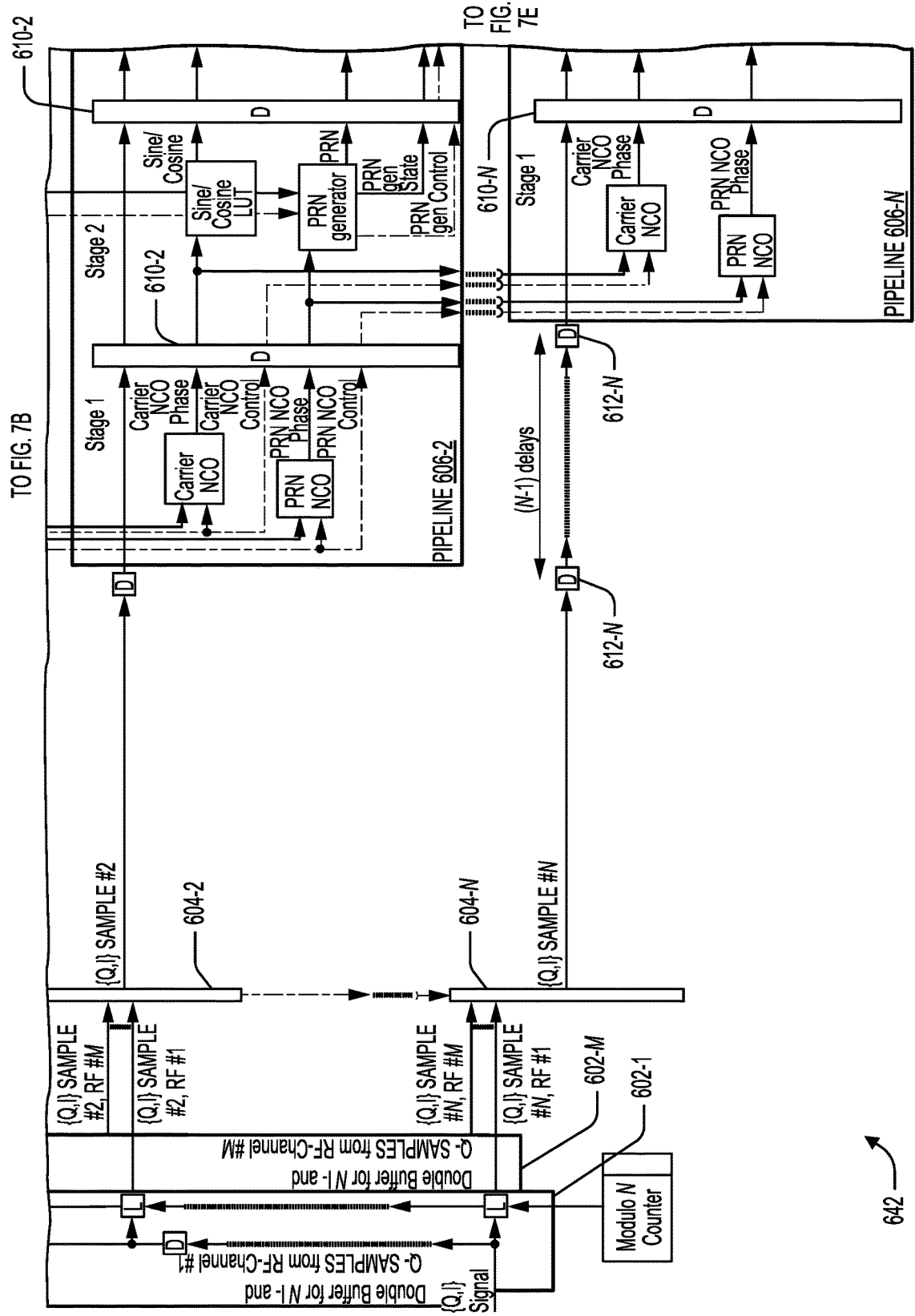
Figure 7E:
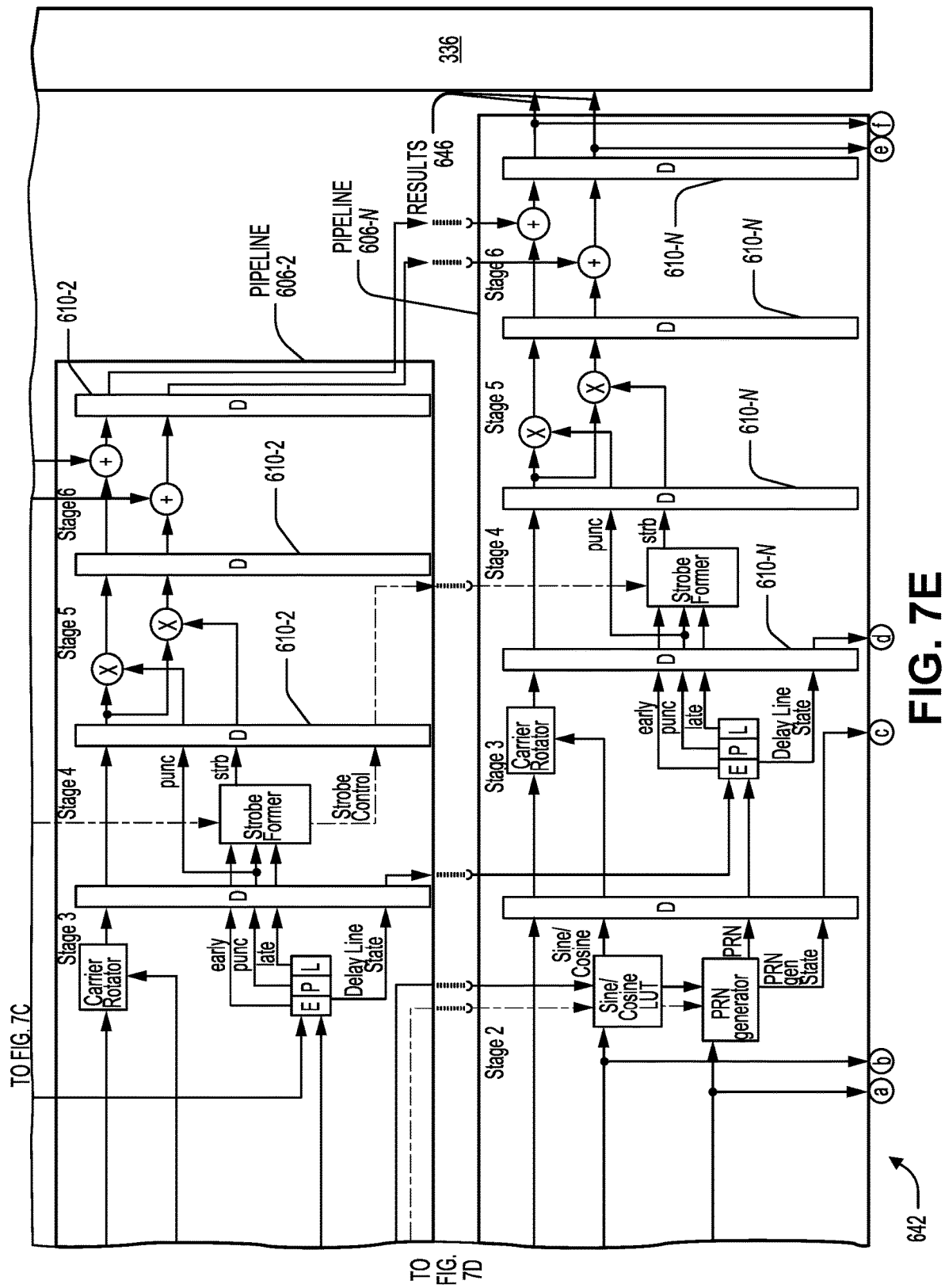

FIG. 6 illustrates an example block diagram of a correlator 642, according to some embodiments of the present disclosure. In the illustrated example, M sets of I/Q samples 334 are provided to M double buffers 602. After passing through double buffers 602, the I/Q samples are provided to input multiplexers 604 which select which samples are provided to N pipelines 606. Each of pipelines 606 comprises 6 stages which are separated by stage latches 610. A first pipeline 606-1 receives control data 344 from receiver processor 336 and generates a first set of interconnect data 608-1 based on control data 344 and a first selected set of I/Q samples 334. Concurrently with operation of first pipeline 606-1, a second pipeline 606-2 receives interconnect data 608-1 from first pipeline 606-1 and generates a second set of interconnect data 608-2 based on first interconnect data 608-1 and a second selected set of I/Q samples 334. Concurrently with operation of first pipeline 606-1 and second pipeline 606-2, an Nth pipeline 606-N receives interconnect data 608-N-1 from a preceding pipeline and generates results 646 based on interconnect data 608-N-1 and an Nth selected set of I/Q samples 334.

FIGS. 7A-7E illustrate an example block diagram of correlator 642 in greater detail, according to some embodiments of the present disclosure. In some embodiments, each of pipelines 606 can be considered as a pipelined version of a single baseband channel of correlator 342. For example, each pipeline may consist of essentially the same set of modules (NCOs, generators, etc.) as each of baseband channels 402. One notable difference is that all the modules are separated from each other with stage latches 610, which allow the states of pipelines 606 to be updated with a rate much faster than in the original scheme due to the fewer number of logic gates between latches, providing shorter signal propagation paths. For example, let $F_{OP}$ be the pipeline operation frequency, Fs be the sampling frequency, and Ts=1/Fs be the corresponding sampling frequency, resulting in OF=$F_{OP}$/Fs as the overclock factor, which may be a value greater than 1.

Each of double buffers 602 is utilized for {Q,I} samples for each of pipelines 606. Each buffer consists of two parts, each of which can store N number of {Q,I}-samples. While the first part of each buffer (indicated by latches "D") accumulates a stream of input {Q,I}-samples incoming at a rate of Fs, the second part (indicated by latches "L") contains N number of {Q,I}-samples collected over the previous operational period(s). Thus each operational period P is (N×Ts) length. The number of overall buffered {Q,I}-samples is (N×M), where M is the number of RF front ends and therefore the number of double buffers 602. These previously collected {Q,I}-samples may stay unchanged during each operation period P and are available for subsequent processing performed by any of pipelines 606. Because each of the pipelines operate OF times faster than Fs, a particular N-length subset of (N×M) previously collected {Q,I}-samples from the second part of the double buffer can be provided as inputs to a pipeline 606 OF times during the current operational period P. Thus, each of the pipelines 606 (e.g., same logic circuits) can be reused OF times but just serve a single RF channel. Thus, the processing done by a single pipeline is comparable to OF traditional baseband channels connected to a single RF front end.

In some embodiments, correlator 642 combines multiple pipelines 606 into a large convolution computation engine that can be applied to GNSS signal processing. Such a configuration increases the number of equivalent traditional baseband channels available with the same amount of FPGA logic up to (N×OF), with N being the number of pipelines.

In some embodiments, the second part of the double buffer copies {Q,I}-samples from the first part of the double buffer with a rate N times slower than Fs. The counter modulo N counter performs N-times division of the Fs clock and generates a latch enable signal for the "L" latches to copy the collected {Q,I}—samples from the first part to the second part of the double buffers. There are M buffers in this scheme, where M is number of front-ends used in the RF section of the receiver.

Pipelines 606 are preceded by input multiplexers 604 that are controlled by an "RF-Input Select" word which comes from a double buffer storage for controls coming from receiver processor 336. The storage is addressed by the channel ID cyclic counter, which updates its state with (OF×Fs) rate and provides all (N×OF) channel identifiers to control stores, while {Q,I}-samples stay unchanged at outputs of the second stage of the double buffers. The counter output can be used for addressing the read port of control stores. In some instances, as the scheme operates continuously, a read-to-write collision could otherwise occur when the controls are be updated from the CPU side but for the set of control double buffers.

In accordance with some embodiments, multiplexed {Q,I}-sample #1 may enter into and propagate through Stage 1 and Stage 2 of the pipeline 606-1 without changes. In parallel, these pipeline stages update carrier and code NCO phases (at Stage 1) and carrier and code generators outputs (at Stage 2). The resulting NCO phases and generators outputs correspond to {Q,I}-sample #1 multiplexed for the equivalent baseband channel identified by output of the channel ID cyclic counter. At Stage 3, the carrier rotator completes the conversion of the input signal to baseband. In parallel, early, punctual, and late copies of the reference PRN are computed. At Stage 4, the early-minus-late strobe is computed while the carrier rotator output goes through the stage without change. At Stage 5, the carrier rotator output is multiplied by the reference PRN and the early-minus-late strobe. At Stage 6, the pipeline processing is completed by accumulating the results of the multipliers.

As the channel ID cyclic counter is updated each (OF×Fs) clock, the particular control word for the next equivalent baseband channel is read. Next, the input multiplexer selects the {Q,I}-sample in accordance with the setting for each equivalent baseband channel each such clock. The (OF×Fs) clock also drives stage latches 610 of each pipeline, allowing each stage of each pipeline to process data for different equivalent baseband channels concurrently. For example, consider pipeline 606-1 after 6 clocks from the moment {Q,I}-samples were copied from the first part to the second part of the input samples buffer:

Stage 1 multiplexes the {Q,I}-sample for the equivalent baseband channel #6 in accordance with the RF-input select control word addressed by the channel ID cyclic counter. Carrier and code NCO phases are updated for the equivalent baseband channel #6.

Stage 2 computes sine, cosine, and PRN waves for the equivalent baseband channel #5. The {Q,I}-sample for the equivalent baseband channel #5 is also present at the stage as an output of the latches of the previous pipeline stage.

Stage 3 completes down-conversion of the received signal and computes early, punctual, and late copies of the reference PRN for the equivalent baseband channel #4.

Stage 4 generates the early-minus-late strobe for the equivalent baseband channel #3.

Stage 5 multiplies the Doppler-free signal by the reference PRN and the early-minus-late strobe for the equivalent baseband channel #2.

Stage 6 performs an accumulation for the equivalent baseband channel #1.

While a single pipeline is equivalent to OF number of traditional baseband channels (as described above), the equivalency is enlarged by N times with the additional (N−1) pipelines and appropriate interconnect data 608, which behave as inter-pipe connections. In some embodiments, interconnect data 608 may be organized by storing, for each of pipelines 606-1 through 606-N-1, the updated states of the accumulating values in stage latches 610 and providing these states as inputs for the same stages of pipelines 606-2 through 606-N, respectively.

In some embodiments, dual port RAM blocks are used to store states of all processing units (e.g., the carrier NCO phase, the PRN NCO phase, the content of PRN generator registers and so on) from one operational period P to another. These states are output from the stage latches of pipeline 606-N. The RAM storing ports (labeled as "a", "b", . . . "f" in circles) are addressed by appropriately delayed values of the channel ID cyclic counter (e.g., the delay latches may be part of pipeline stage latches and are not shown in the scheme). The RAM read ports (the upper ports in the illustrated example) are used for reading the states for units of the appropriate equivalent baseband channel. These ports are addressed either by the channel ID cyclic counter directly or by a corresponding delayed value of the counter. The RAM outputs are fed into stages of pipeline 606-1 where they are used for the first time for processing the first {QI}-sample of the newly copied {Q,I}-samples.

In some embodiments, {Q,I}-sample #2 may pass through a single delay latch (pre-pipeline latch 612-1) prior to entry into Stage 1 of pipeline 606-2. The sample then passes through the stage without changing similar to {Q,I}-sample #1 in pipeline 606-1. In parallel, the code and carrier NCOs of pipeline 606-2 update their phases at this stage. As a result, the output of the NCOs phases at Stage 1 of pipeline 606-2 corresponds to {Q,I}-sample #2 similar to how the NCOs phases at Stage 1 of pipeline 606-1 corresponded to {Q,I}-sample #1 at one pipeline operation clock before. Similarly, {QI}-sample #3 may pass through 2 delay latches prior to entry into Stage 1 of the third pipeline. This continues until {Q,I}-sample #N passes through N−1 delay latches prior to entry into Stage 1 of pipeline 606-N. Thus, Stage 1 for all pipelines 606 generate NCOs phases corresponding to {QI}-samples #1 . . . #N. The same applies to all stages of each pipeline: units in the stages update their states synchronously to the {Q,I}-samples which should be processed using the outputs of the units.

As mentioned above, {QI}-samples (at the double buffer samples output) stay unchanged during the operational period P. At each of the pipeline operation clocks corresponding to (OF×Fs), all N input multiplexers 604 select a N-length subset of (N×M) buffered {QI}-samples in accordance with the RF-input select control word for one of the (N×OF) equivalent baseband channels. During the whole {Q,I}-samples stability interval, (N×OF) pipe operational clocks occur and therefore (N×OF) bunches (N-length subsets) of (N×M) buffered {Q,I}-samples are provided to pipelines 606. Thus, during each operational period P, the number of processed bunches of {Q,I}-samples are equal to the number of equivalent channels (N×OF). Once all (N×OF) bunches of {Q,I}-samples have been sent to pipelines 606 (e.g. the current operational period P has been completed), the {Q,I}-samples can be copied from the buffer's first part to the second part, and the same processing may be accomplished.

Results 646 may correspond to correlation values computed over N samples for each of the (N×OF) equivalent baseband channels. Results 646 appear at the output of Stage 6 of pipeline 606-N. In some embodiments, they have a latency equal to (6×N) of the pipeline operation clocks. As the latency is the same for each of the (N×OF) equivalent baseband channels, the latency may be ignored or accounted for in subsequent processing by receiver processor 336. During the (N×OF) pipeline operation clocks, pipelines 606 may compute correlation values for each of the (N×OF) equivalent baseband channels.

Figure 8:
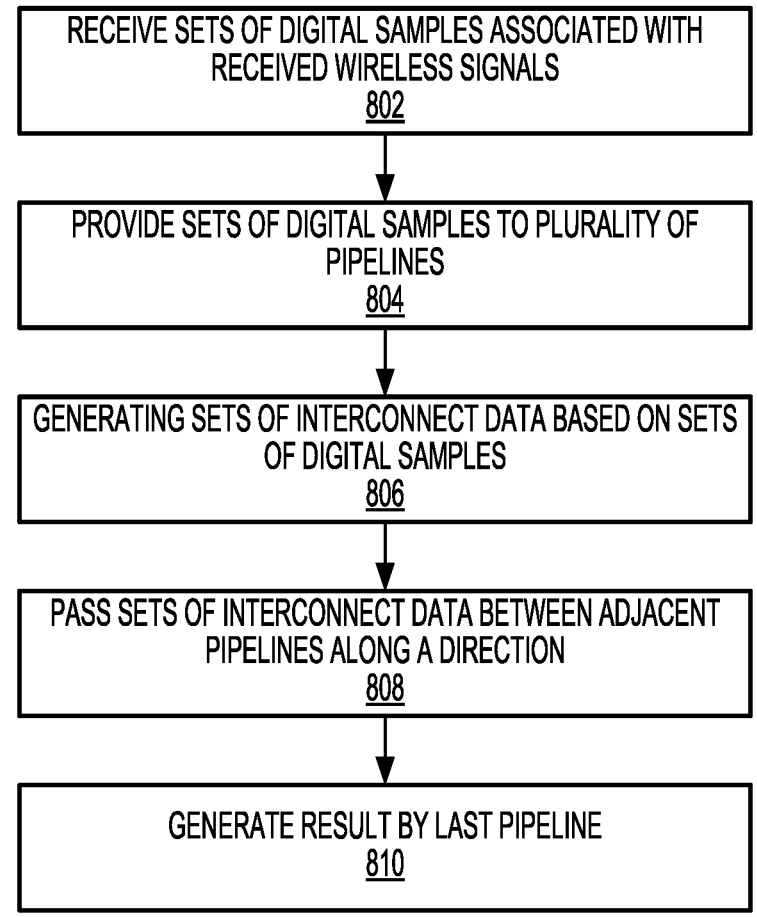
FIG. 8 illustrates a method for operating a GNSS receiver.

FIG. 8 illustrates a method 800 for operating a GNSS receiver (e.g., GNSS receiver 210), according to some embodiments of the present disclosure. One or more steps of method 800 may be omitted during performance of method 800, and steps of method 800 need not be performed in the order shown. Method 800 may be implemented as a computer-readable medium or computer program product comprising instructions which, when the program is executed by one or more computers, cause the one or more computers to carry out one or more steps of the method. Such computer program products can be transmitted, over a wired or wireless network, in a data carrier signal carrying the computer program product.

At step 802, sets of digital samples (e.g., I/Q samples 334) associated with received wireless signals are received. In some embodiments, the sets of digital samples may be received by a component of the GNSS receiver such as a correlator (e.g., correlators 342, 642). In some embodiments, the sets of digital samples are received from at least one front end (e.g., front end 330) of the GNSS receiver. In some embodiments, each of the sets of digital samples corresponds to a particular RF path.

At step 804, the sets of digital samples are provided to a plurality of pipelines (e.g., pipelines 606). In some embodiments, each of the plurality of pipelines includes a plurality of stages (e.g., Stages 1-6). In some embodiments, each of the plurality of stages includes one or more digital logic circuits. In some embodiments, the plurality of stages are separated by a plurality of latches (e.g., stage latches 610). In some embodiments, the one or more digital logic circuits of a particular stage of the plurality of stages are identical to the one or more digital logic circuits of corresponding stages between different pipelines of the plurality of pipelines.

At step 806, sets of interconnect data (e.g., interconnect data 608) are generated by the plurality of pipelines based on the sets of digital samples. In some embodiments, the sets of interconnect data include at least one accumulating value (e.g., the output of addition/summation blocks in Stage 6 of pipelines 606). In some embodiments, the sets of interconnect data are generated by one or more of the plurality of pipelines. For example, the sets of interconnect data may be generated by each of the plurality of pipelines except for a last pipeline. In some embodiments, each of the sets of interconnect data are generated by a particular pipeline based on the set of digital samples provided to the particular pipeline and the set of interconnect data passed to the particular pipeline.

In some embodiments, generating the sets of interconnect data based on the sets of digital samples includes generating, by the first pipeline, a first set of interconnect data based on a first set of digital samples of the sets of digital samples and control data provided by a receiver processor, generating, by a second pipeline of the plurality of pipelines, a second set of interconnect data based on a second set of digital samples of the sets of digital samples and the first set of interconnect data, and generating, by a third pipeline of the plurality of pipelines, a third set of interconnect data based on a third set of digital samples of the sets of digital samples and the second set of interconnect data.

At step 808, the sets of interconnect data are passed between adjacent pipelines of the plurality of pipelines. In some embodiments, the sets of interconnect data are passed between adjacent pipelines of the plurality of pipelines along a direction. For example, the first pipeline may generate and pass the first set of interconnect data to the second pipeline, which may generate and pass the second set of interconnect data to the third pipeline.

At step 810, a result may be generated based on the at least one accumulating value. In some embodiments, the last pipeline of the plurality of pipelines may generate the result based on the at least one accumulating value. For example, the output(s) of an accumulator (e.g., addition/summation block) of the last pipeline may be generated and provided to the receiver processor.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An apparatus comprising:
   a set of inputs for receiving sets of digital samples associated with received wireless signals, wherein each of the sets of digital samples corresponds to a particular radio-frequency (RF) path;
   a plurality of pipelines each including a plurality of stages, wherein each of the plurality of stages includes one or more digital logic circuits, and wherein the plurality of pipelines are configured to generate sets of interconnect data based on the sets of digital samples and pass the sets of interconnect data between adjacent pipelines of the plurality of pipelines; and a plurality of delay elements that precede the plurality of pipelines and that delay the sets of digital samples prior to entry in the plurality of pipelines, wherein each of the plurality of pipelines is preceded by a different number of the plurality of delay elements.

2. The apparatus of claim 1, wherein the sets of interconnect data include at least one accumulating value.

3. The apparatus of claim 2, wherein the plurality of pipelines are configured to generate a result based on the at least one accumulating value.

4. The apparatus of claim 1, wherein the sets of interconnect data are passed between the adjacent pipelines of the plurality of pipelines along a direction.

5. The apparatus of claim 1, wherein the sets of digital samples are received from at least one front end of a global navigation satellite systems (GNSS) receiver.

6. The apparatus of claim 1, wherein the apparatus is configured to receive, from a receiver processor, control data for the plurality of pipelines and to provide the control data to a first pipeline of the plurality of pipelines.

7. The apparatus of claim 6, wherein generating the sets of interconnect data based on the sets of digital samples includes:
generating, by the first pipeline, a first set of interconnect data based on a first set of digital samples of the sets of digital samples and the control data;
generating, by a second pipeline of the plurality of pipelines, a second set of interconnect data based on a second set of digital samples of the sets of digital samples and the first set of interconnect data; and
generating, by a third pipeline of the plurality of pipelines, a third set of interconnect data based on a third set of digital samples of the sets of digital samples and the second set of interconnect data.

8. The apparatus of claim 7, wherein passing the sets of interconnect data between the adjacent pipelines of the plurality of pipelines includes:
passing the first set of interconnect data from the first pipeline to the second pipeline; and
passing the second set of interconnect data from the second pipeline to the third pipeline.

9. The apparatus of claim 1, further comprising:
a plurality of latches separating the plurality of stages.

10. The apparatus of claim 1, wherein the one or more digital logic circuits of a particular stage of the plurality of stages are identical to the one or more digital logic circuits of corresponding stages between different pipelines of the plurality of pipelines.

11. The apparatus of claim 1, wherein the plurality of delay elements include latches.

12. A method comprising:
receiving sets of digital samples associated with received wireless signals, wherein each of the sets of digital samples corresponds to a particular radio-frequency (RF) path;
delaying the sets of digital samples using a plurality of delay elements;
providing the sets of digital samples to a plurality of pipelines, wherein each of the plurality of pipelines includes a plurality of stages, wherein each of the plurality of stages includes one or more digital logic circuits, wherein the plurality of delay elements precede the plurality of pipelines, and wherein each of the plurality of pipelines is preceded by a different number of the plurality of delay elements;
generating, by the plurality of pipelines, sets of interconnect data based on the sets of digital samples; and
passing the sets of interconnect data between adjacent pipelines of the plurality of pipelines.

13. The method of claim 12, wherein the sets of interconnect data include at least one accumulating value.

14. The method of claim 13, further comprising:
generating, by the plurality of pipelines, a result based on the at least one accumulating value.

15. The method of claim 12, wherein the sets of interconnect data are passed between the adjacent pipelines of the plurality of pipelines along a direction.

16. The method of claim 12, wherein the sets of digital samples are received from at least one front end of a global navigation satellite systems (GNSS) receiver.

17. The method of claim 12, further comprising:
receiving control data for the plurality of pipelines and to provide the control data to a first pipeline of the plurality of pipelines.

18. The method of claim 17, wherein generating the sets of interconnect data based on the sets of digital samples includes:
generating, by the first pipeline, a first set of interconnect data based on a first set of digital samples of the sets of digital samples and the control data;
generating, by a second pipeline of the plurality of pipelines, a second set of interconnect data based on a second set of digital samples of the sets of digital samples and the first set of interconnect data; and
generating, by a third pipeline of the plurality of pipelines, a third set of interconnect data based on a third set of digital samples of the sets of digital samples and the second set of interconnect data.

19. The method of claim 18, wherein passing the sets of interconnect data between the adjacent pipelines of the plurality of pipelines includes:
passing the first set of interconnect data from the first pipeline to the second pipeline; and
passing the second set of interconnect data from the second pipeline to the third pipeline.

20. The method of claim 12, wherein the one or more digital logic circuits of a particular stage of the plurality of stages are identical to the one or more digital logic circuits of corresponding stages between different pipelines of the plurality of pipelines.

\* \* \* \* \*